United States Patent [19] [11] 3,917,029
Maynard [45] Nov. 4, 1975

[54] TRANSPORTATION SYSTEM WITH BRAKE CONTROL AND COMBINED BRAKE AND FIELD POWER SUPPLY

[75] Inventor: John T. Maynard, New Berlin, Wis.
[73] Assignee: Armor Elevator Company, Louisville, Ky.
[22] Filed: May 10, 1974
[21] Appl. No.: 468,875

[52] U.S. Cl. ............................................. 187/29 R
[51] Int. Cl.² .......................................... B66B 1/32
[58] Field of Search ..................................... 187/29

[56] References Cited
UNITED STATES PATENTS

| | | | |
|---|---|---|---|
| 2,757,758 | 8/1956 | Ghalib et al. | 187/29 |
| 2,994,025 | 7/1961 | Mitchell | 187/29 X |
| 3,613,835 | 10/1971 | Vizzotto | 187/29 |
| 3,631,326 | 12/1971 | Virkkala et al. | 187/29 X |

Primary Examiner—Robert K. Schaefer
Assistant Examiner—W. E. Duncanson, Jr.
Attorney, Agent, or Firm—Andrus, Sceales, Starke & Sawall

[57] ABSTRACT

A solid-state static power converter receives a three-phase A.C. input and directly supplies direct current to a D.C. motor armature circuit to operate a traction sheave to control the movement of an elevator car in response to an error signal derived by the selective summation of a speed signal from a tachometer and a vehicle speed command signal. A combined solid-state static power converter receives the three-phase A.C. input and directly supplies direct current to a field circuit of the D.C. motor in response to the operation of a field gating control circuit and also directly supplies direct current to a brake operating solenoid circuit controlling a friction braking element selectively coupled to an output shaft of the D.C. motor. The combined field and brake static power converter includes three controlled rectifying devices and three diodes connected to selectively supply half-wave rectified uni-directional power to the field circuit while a fourth controlled rectifier is connected to one of the phases and cooperates with one or more of the diodes utilized in the field current conversion together with one field output lead to supply uni-directional energy to the brake solenoid. The brake gating control includes a summing circuit receiving an alternating phase reference signal from the source through a lag filter circuit, a disable signal from the source through lead and lag filtering circuits, a constant reference signal, and a brake energy command signal supplied from a second summing circuit. The second summing circuit receives a brake lifting command signal in response to the supervisory control and a brake energy sensed feedback signal.

24 Claims, 8 Drawing Figures

TRANSPORTATION SYSTEM WITH BRAKE CONTROL AND COMBINED BRAKE AND FIELD POWER SUPPLY

BACKGROUND OF THE INVENTION

This invention relates to a transportation system and specifically to an apparatus which controls the energization of a brake coupled to the output of a motive means.

Transportation systems, such as elevators, generally operate a transport vehicle along a guide path structure to serve a plurality of spaced landings. Such systems usually provide a control to regulate the energy supplied to one or more motor circuits so that the motor operates to supply a driving output through an output shaft to operate the transport vehicle for movement between the landings.

Many transportation systems such as elevators have utilized a braking element such as friction engaging brake shoes to selectively engage the motor output drive shaft which operates a traction sheave to control the movement of the elevator car. Some friction type brake shoes have been normally biased to a fully braking condition for maximum engagement with the drive shaft and have been selectively lifted by the energization of a solenoid coil operating to provide a brake lifting force upon an actuating plunger or connector coupled to the brake shoes.

In some elevator type transportation systems, the solenoid coil which controls the friction braking element has been energized to lift the brake shoes approximately simultaneously with the energization of the motive means to permit the vehicle to initiate movement from a landing. Some systems have also provided continued energization of the brake solenoid coil to maintain the brake shoes lifted during an entire normal running sequence from one landing to another landing at which a stop is to be made and selectively de-energize the solenoid coil after the car has stopped at the selected landing to set the brake shoes and hold the car at the selected landing so that the motive means may be de-energized.

Other elevator type transportation systems have selectively controlled the energization of a solenoid coil which operates a friction type braking element for operatively decelerating the vehicle to stop at a selected landing. One known system such as show in U.S. Pat. No. 3,613,835 combines a decelerating command pattern signal with a speed signal supplied from a tachometer connected to the motive means output for providing an error signal variably energizing the brake solenoid coil and providing variable braking during the deceleration while disconnecting power from the motive means.

Some elevator type transportation systems such as shown in U.S. Pat. No. 2,994,025 have sensed the energy supplied to a brake operating solenoid coil while the brake is in a set condition to selectively operate a pair of thyratrons for conducting energy to the brake coil to maintain the brake energization at a constant magnitude to supply a constant braking force to the set brake shoes. Such brake energy sensing as in the U.S. Pat. No. 2,994,025 patent is effective for controlling the brake energization only when the car approaches to within a very close predetermined distance from a landing at which a stop is to be made and operates only after the motive means has been disconnected from the source so that the brake shoes maintain constant decelerating pressure upon the motor output shaft to provide smooth stopping.

SUMMARY OF THE INVENTION

This invention relates to transportation systems and specifically to an apparatus which controls the energization of a brake coupled to the output of a motive means.

The transportation system of the present invention includes a transport vehicle which is mounted for movement along a guide path structure to serve a plurality of spaced landings. Such vehicle movement is selectively provided by a motive means output while braking means including a friction braking element is coupled to the output and operates between lifting and set conditions to selectively permit vehicle movement. A control means cooperates with both the motive means and the braking means to control the movement of the vehicle relative to the structure and to stop the vehicle at a selected landing. The control means includes brake control means which is connected to a source of energy and includes output means controlling the amount of energy supplied from the source to the braking means in response to a command signal commanding the braking element to operate to a lifted condition and a brake energy signal related to the energy supplied to the braking means.

In another aspect of the invention, the brake control means is connected to a source of alternating energy and selectively supplies controlled amounts of the source energy to the braking means. Sensing means is connected to the source and provides an alternating source indicative signal relating to the alternating source energy while command means provides a brake energy command signal. The brake control means provides an output to control the amount of energy supplied from the source to the braking means in response to both the command signal and the alternating source indicative signal.

In a preferred construction, output means of the brake control means includes a controllable gated rectifying means connected for selectively supplying the alternating energy supplied by the source to a brake solenoid circuit connected to control the friction braking element. The brake energy indicative signal is specifically provided by sensing the voltage across the solenoid circuit.

The highly desirable brake control system provides first summing means which provides an analog output to the output means in response to the direct summation of a brake lifting command signal and the sensed brake energy signal. Such an analog signal is supplied to a switching circuit which selectively operates from a first condition to a second condition to selectively render the grated rectifying means conductive in response to the analog output. In a preferred construction, the magnitude of the analog output supplied by the first summing means is effective for dictating the conduction time of the gated rectifying means during each cycle of the alternating source input. Such selective control of the conduction of the gated rectifying means controls the magnitude of the energy supplied to the brake operating solenoid coil.

A highly desirable second summing means is coupled to receive the alternating source indicative signal together with a brake energizing command signal such as applied from the first summing means for providing an output to selectively energize the braking means. The alternating source reference signal is supplied to the second summing means from the source through a lag filter network which ensures that the alternating reference signal has the proper phase relationship with the respect to the source phase supplied to the gated rectifying means controlling the energy supplied to the braking means.

Disable means is also provided and is connected to the source and to the second summing means for supplying a disable signal to operatively prevent the conduction of energy by the gated rectifying means to the braking means during a predetermined portion of each cycle of source energy. In a preferred construction, the disable means includes a lag filter network connected to the source and to the second summing circuit through a lead filter network for supplying to the second summing means a disable signal having the proper phase sequence. The lag and lead filter networks also provide stability to the circuit operation. The disable signal ensures that the controlled rectifying means is capable of being rendered conductive only when the controlled phase is of the proper polarity.

A highly desirable second summing is provided in which the brake energizing command signal, the alternating source indicative signal and the disable signal are summed at a common summing circuit with a constant reference signal provided by a reference circuit to operatively provide an analog output for controlling the period of conduction of the gated rectifying means and thus the magnitude of the energy supplied to the braking means. The output from the second summing circuit operatively controls switching means which provides an output selectively operable from a first condition to a second condition thereby selectively rendering the gated rectifying means conductive to conduct energy from the source to the braking means. Specifically, a first switching circuit provides a first input circuit connected to the second summing means and provides a first output circuit connected to a second input circuit of a second switching circuit. The second switching circuit provides a second output connected to energy storage means through a primary winding of an output transformer. In operation, the storage means is selectively connected to supply an energy pulse to the primary winding of the output transformer which, in turn, provides an output pulse through an output winding connected directly to operate the gated rectifying means.

Two highly novel summing circuits are interconnected to control the conduction of a gated rectifying circuit for selectively supplying controlled amounts of uni-directional energy to the brake solenoid circuit. The two summing circuits discussed herein are a part of the overall transportation system control means which otherwise functions to supply energy to the motive means to initiate the vehicle movement. In a preferred operation, the control means provides a brake lifing command signal to the brake control means at about the same time or shortly after energy is being supplied to the motive means to thereby lift the brake shoes and permit the motor to drive and operate the transport vehicle.

The sensing of brake lifting energy supplied to the brake operating solenoid coil to provide a proportional signal to the first summing circuit provides a highly desirable sequence of operation when initiating commanded movement of the vehicle. Specifically, the supervisory control initiates a command for vehicle movement and supplies the brake lifting command signal to the first summing circuit which functions to operate the gated rectifying circuit at its maximum current conducting capability for supplying the maximum amount of brake lifting energy to the solenoid coil. Such continued maximum energization of the solenoid coil for any great length of time would tend to burn out the coil resulting in a malfunction in the system. On the other hand, the maximum energization of the initiation of vehicle movement rapidly lifts the brake shoes from the motive means output shaft to provide a highly desirable operation. The feedback of the brake voltage proportional signal to the first summing circuit is designed to modify the analog output of the summing circuit to command a reduction in the magnitude of the energization of the brake solenoid by commanding the controlled rectifying means to conduct during shorter time periods of each source cycle thereby reducing the brake voltage to a desirable magnitude for retaining the brake shoes lifted. The summation of the brake lifting command signal and the fedback brake voltage proportional signal quickly stabilizes the brake control system to maintain the brake in a lifted condition under the reduced magnitude of brake energization.

In another aspect of the invention, a combined brake and field power supply is connected to supply energy from a polyphase energy source to a field circuit of the motive means and to braking means coupled to the output of the motive means to selectively permit vehicle movement. Specifically, each source phase has a pair of rectifying devices connected thereto and across first and second output leads which supply energy to the field circuit. In a highly novel aspect of the invention, a gated rectifying device is connected to one of the source phases and to a third output lead with the first and third output leads connected to supply energy to the braking means in response to brake control means selectively controlling the operation of the gated rectifying device.

The novel invention employs a gated static power converter having three controlled rectifiers and three associated diodes connected to the three phases of the A.C. input to supply controlled amounts of half-wave rectified current to a field circuit and has employed certain elements within the static field current converter for use in converting the alternating source energy into uni-directional energy to energize the brake solenoid circuit. Basically, applicant has added one controlled rectifying device and one flyback diode with the half-wave rectifying field energy converting circuitry. The flyback diode is placed across the brake solenoid winding for protective purposes. Applicant in essence utilizes one or more diodes in the field static converting circuitry in cooperation with the added controlled rectifying device for conducting uni-directional energy to the brake solenoid circuit.

A highly desirable transportation system is thus provided with a novel brake control and combined brake and field power supply which operates in response to a plurality of system conditions for providing a highly regulated output.

BRIEF DESCRIPTION OF THE DRAWINGS

The drawings furnished herewith illustrate a preferred construction of the present invention in which the above advantages and features are clearly disclosed as well as others which will be clear from the following description.

In the drawings.

DESCRIPTION OF THE PREFERRED ILLUSTRATED EMBODIMENT

Figure 1:
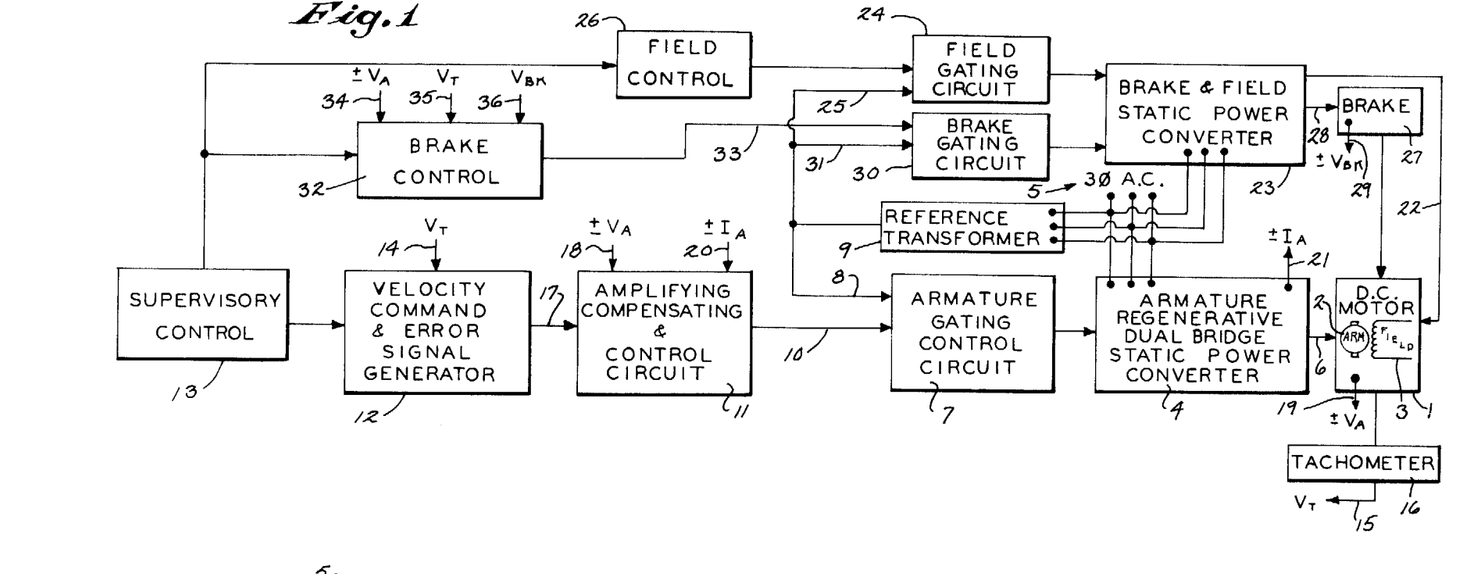
FIG. 1 is a block diagrammatical view illustrating an elevator system incorporating the present invention.
Figure 5:
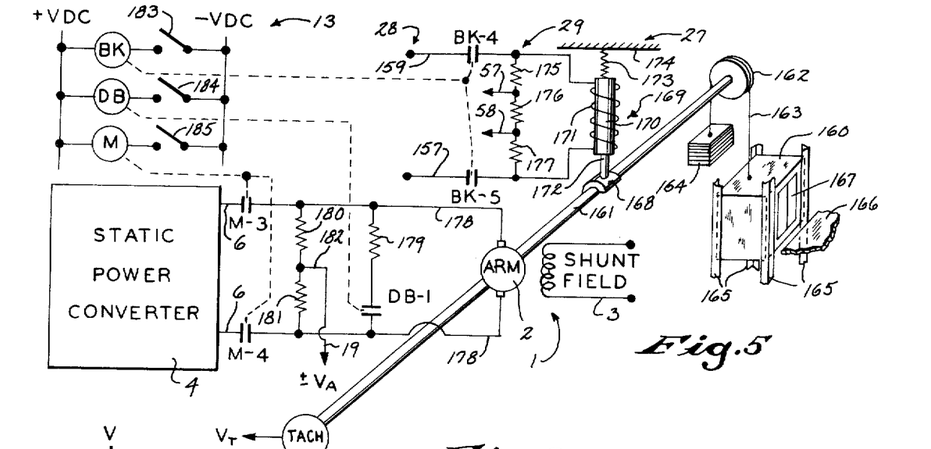
FIG. 5 is a diagrammatical illustration showing the connection of a D.C. motor and an electro-magnetic brake in FIG. 1 to control an elevator car.

Referring to the drawings and particularly FIG. 1, and elevator system is illustrated in block diagrammatic form and includes a direct current drive motor 1 having an armature circuit 2 and a field circuit 3 connected to operate an elevator car (as shown in FIG. 5). A static power converter 4 operates to convert a three-phase alternating current input supplied from a source 5 to a direct current at an output 6.

In operation, the controlled rectifiers within the dual bridge networks of the static power converter 4 are selectively rendered conductive to supply varying controlled amounts of direct current at output 6 according to a firing sequence established by the armature gating circuit 7 for controlling the movement of the elevator car in a predetermined commanded mode of operation. The direction of current flow at the output 6 may be reversed by converter 4 to the reverse direction of travel of the elevator car or to provide regenerative braking.

The armature gating circuit 7 responds to the phase sequence of the three-phase alternating current supplied from source 5 as sensed at an input 8 supplied from a reference transformer 9 to thereby control the sequence of conduction or firing of the controlled rectifiers within the static power converter 4. The armature gating circuit 7 further operates in response to a gating control signal supplied at an input 10 from an amplifying, compensating and control circuit 11 and an error signal generator 12.

Specifically, a velocity command signal is generated within the generator 12 upon initiation of a car starting sequence by a supervisory control 13 and is combined with a velocity signal $V_T$ supplied at lead 14 which is proportional to the actual speed of the elevator car as supplied by an output 15 of a tachometer 16 for providing an error signal at an output lead 17. The error signal 17 is a difference signal which represents a deviance in the actual speed of the elevator system represented by the signal $V_t$ at input 14 from a desired or commanded speed to vary the energization of the armature circuit 2 and speed up or slow down the elevator motor 1 to maintain the elevator car at the commanded speed.

The error signal at 17 is supplied to the circuit 11 which, in turn, receives an armature voltage signal $\pm V_A$ at an input 18 as supplied from an output 19 at the armature circuit 2 and an armature current signal $\pm I_A$ at an input 20 supplied from an output 21 at the static power converter 4. The circuit 11 compensates the error signal supplied from lead 17 in accordance with the sensed armature current losses and further provides a continuous armature current limit. The polarity of the error signal at 17 is also sensed by the circuit 11 to selectively actuate either the forward or reverse control circuits within the gating circuit 7 to control the respective forward or reverse bridge circuits within the static power converter 4 to provide either the desired up or down direction operation of the elevator car or regenerative braking.

The field circuit 3 of the D.C. motor 1 is energized through a circuit 22 by a brake and field static power converter 23. The static converter 23 selectively provides the requisite amount of direct current power through the circuit 22 to the field circuit 3 from an alternating current power source such as at 5. The amount of direct current supplied by the converter 23 to the circuit 22 is controlled by a field gating circuit 24 which is phase controlled through an input circuit 25 connected to the reference transformer 9. The field gating circuit 24 is also connected to be controlled by a field control 26 which responds to the start-up and shut-down sequences initiated by the supervisory control 13.

A brake 27 provides solenoid operated brake shoes or other friction devices which are coupled to a drive shaft output of the D.C. motor 1. The brake 28 operates when de-energized to fully engage the drive shaft to prevent the elevator car from moving and is energized to permit movement as more fully described hereinafter. The energization of brake 27 is controlled by the brake and field static power converter 23 through an input circuit 28. The direct current energizing power supplied through the circuit 28 to the brake 27 is sensed at an output 29 to provide a signal $\pm V_{BK}$ indicative of the brake energizing power which has been converted to D.C. by the converter 23 from the three-phase A.C. input 5.

The static converter 23 contains controlled rectifiers at least one of which is selectively rendered conductive in response to the operation of a brake gating circuit 30. The gating circuit 30 responds to the phase sequence of the three-phase alternating current input 5 as supplied from the transformer 9 through an input circuit 31 and to a firing control signal supplied from a brake control 32 through an input circuit 3. The control 32 responds to the supervisory control 13 for initiating brake lifting and brake setting. The control 32 is also capable of responding to the armature voltage signal $\pm V_A$ at an input circuit 34 which is supplied from the output lead 19, the speed signal $V_T$ at input circuit 35 which is supplied from the output circuit 15, and the brake lifting voltage $\pm V_{BK}$ at an input circuit 36 which is supplied from the output circuit 29.

The elevator system shown in FIG. 1 is more fully described in the copending applications of J. Maynard entitled "TRANSPORTATION SYSTEM WITH MALFUNCTION MONITOR" having Ser. No. 465,271 filed on Apr. 29, 1974 and "TRANSPORTATION SYSTEM WITH MOTOR FIELD CONTROL" having Ser. No. 468,864 filed on an even date herewith and such applications are incorporated by reference herein.

Figure 2:
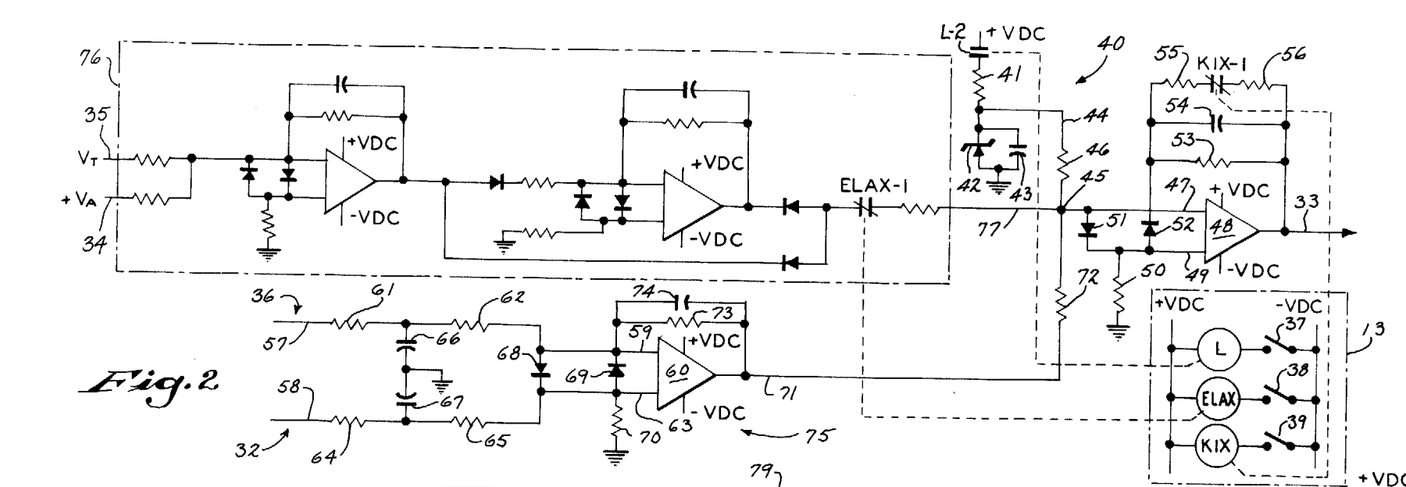
FIG. 2 is a circuit schematic showing the brake control in FIG. 1.

The brake control 32 is shown in FIG. 2 along with a portion of the supervisory control 13 illustrated for the sake of clarity as including a relay circuit in an across-the-line construction between a positive constant potential D.C. voltage source +VDC and a negative constant potential D.C. voltage source −VDC. Specifically, the supervisory control 13 includes a line contactor relay L connected in circuit through an open switch 37, and an emergency landing second auxiliary relay ELAX connected in circuit by an open switch 38 and a first kill relay KIX connected in circuit by an open switch 39. Although shown as manually operable, the switches 37 through 39 inclusive preferably take the form of automatically operated relay contacts or other switching solid-state circuitry and a description thereof is found in the above referred to application entitled "TRANSPORTATION SYSTEM WITH MALFUNCTION MONITOR."

The brake control 32 includes a command signal circuit 40 which is connected to a positive constant voltage source +VDC through the normally open contacts L-2 of the line contactor relay. Specifically, the positive voltage source +VDC is connected to the system ground through the contacts L-2 and a resistor 41 and a Zener diode 42, the latter parallel connected to a capacitor 43. An output circuit 44 is connected to the juncture between the resistor 41 and the Zener diode 42 to provide a predetermined constant voltage output for supplying a command signal to a summing circuit 45 through resistor 46.

The summing circuit 45 is connected to an inverting input 47 of a high gain amplifier 48 which operates to supply an output to the lead 33. A non-inverting input 49 of the amplifier 48 is connected to the system ground through a resistor 50 while the diodes 51 and 52 are parallel connected with opposite orientation between the inputs 47 and 49 to protect the amplifier from abnormal transient conditions. The output circuit 33 is connected to the inverting input 47 through a gain setting resistor 53 which is parallel connected to a capacitor 54 and a circuit including a serially connected resistor 55, the normally closed contacts KIX-1 of the first kill relay, and a resistor 56.

The brake voltage $\pm V_{BK}$ supplied from the output at 29 is coupled to the input circuit 36 including a pair of input leads 57 and 58. The lead 57 is connected to an inverting input 59 of an amplifier 60 through a serially connected circuit including resistors 61 and 62. The lead 58 is connected to a non-inverting input 63 of the amplifier 60 through the serially connected circuit including resistors 64 and 65. The juncture between resistors 61 and 62 is coupled to the system ground through a capacitor 66 while the juncture between the resistors 64 and 65 is coupled to the system ground through a capacitor 67. A pair of diodes 68 and 69 are oppositely connected in parallel circuit between the inverting input 59 and the non-inverting input 63 of the amplifier 60 to provide circuit protection while the input 63 is also coupled to the system ground through a resistor 70.

The amplifier 60 provides an output circuit 71 which is connected to the summing circuit 45 through a resistor 72 and is also connected to the inverting input 59 through a parallel connected circuit including a resistor 73 and a capacitor 74.

A feedback circuit 75 is thus provided connecting the brake 27 with the summing circuit 45 for supplying a signal proportional to the brake lifting energy.

An emergency landing mode monitoring circuit 76 is shown enclosed within dotted lines and is connected to the input lead 34 for receiving the armature voltage signal $\pm V_A$ and to the input lead 35 for receiving the speed signal $V_T$ for operatively and selectively providing an output at a lead 77 to the summing circuit 45. Under a normal operation in which the system is operating properly, the switch 38 would be closed to energize the emergency landing second auxiliary relay ELAX thus opening the contacts ELAX-1 to disconnect the emergency landing mode monitoring circuit 76 from the summing circuit 45. The circuit construction and operation of the monitoring circuit 76 is not a part of the present invention as defined by the claims submitted herewith and is described in detail in the above referred to application entitled "TRANSPORTATION SYSTEM WITH MALFUNCTION MONITOR". The system can operate with the control provided by the command circuit 40 and the feedback circuit 75 to control the operation of the brake 27 without the circuitry within the monitoring circuit 76, the latter providing a highly desirable safety feature in the event of a sensed malfunction within the operating system.

Figure 3:
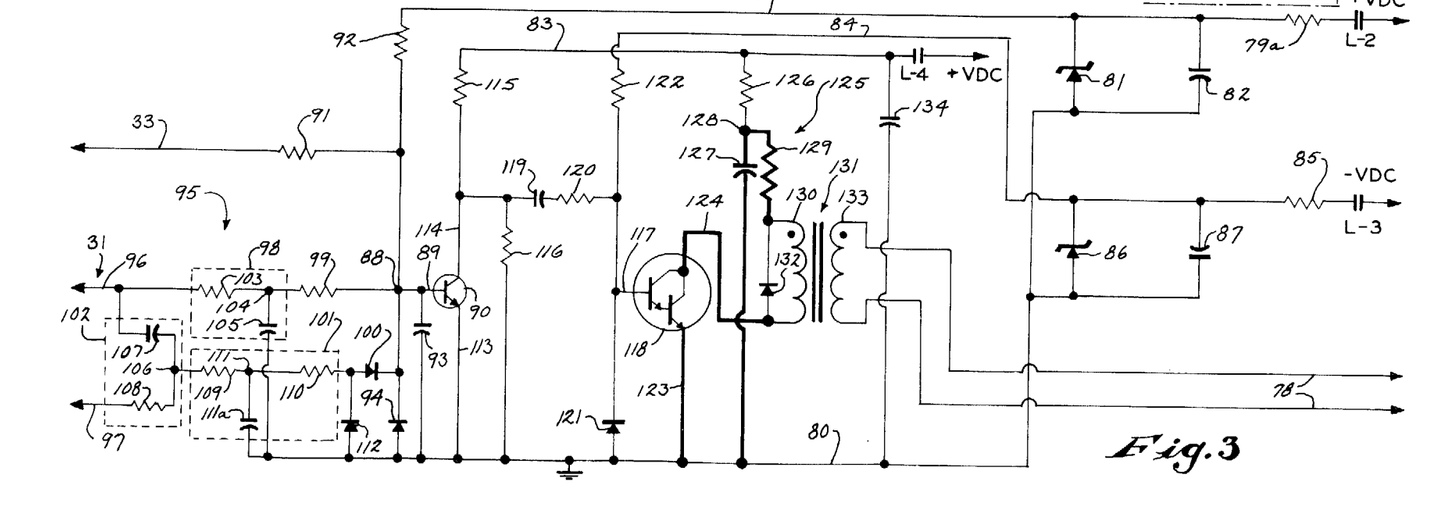
FIG. 3 is a circuit schematic showing the brake gating circuit of FIG. 1.

The brake gating circuit 30 shown in FIG. 3 is coupled to receive a control signal input from the brake control circuit 32 through the lead 33 and provides an output to the brake and field static power converter 23 through a pair of leads 78. A constant positive regulated voltage lead 79 is connected to a positive voltage source +VDC through a resistor 79a and the normally open contacts L-2 of the line contactor relay. The positive voltage lead 79 is also connected to a system ground lead 80 through a parallel connected circuit including a Zener diode 81 and a capacitor 82. The positive constant voltage upon lead 79 could constitute a +13 volts D.C. signal. A positive constant voltage source lead 83 is connected to the positive voltage source +VDC through a normally open contacts L-4 of the line contactor relay for providing a positive voltage signal, such as +34 volts, for example. A constant negative regulated voltage lead 84 provides a negative voltage signal, such as −13 volts D.C. for example, and is connected to the source −VDC through a resistor 85 and the normally open contacts L-3 of the line contactor relay. The lead 84 is also connected to the system ground lead 80 through a parallel connected circuit including a Zener diode 86 and a capacitor 87.

The brake command signal supplied from the brake control 32 on the lead 33 is coupled to a summing circuit 88 which, in turn, is connected to a base circuit 89 of an NPN type transistor 90 through a resistor 91. The base circuit 89 is also connected to the positive voltage lead 79 through a resistor 92 and to the system ground lead 80 through a parallel connected circuit including capacitor 93 and diode 94. A phase sensing circuit 95 is connected to the summing circuit 88 and to the phase input 31 including a pair of input leads 96 and 97. The input lead 96 is connected to supply a phase signal designated $V_{AN}$ which is proportional and alternates in phase with the source line voltage of phase A with respect to a neutrak potential neutral the input lead 97 receives a phase signal $V_{NA}$ which is one hundred eighty degrees out of phase with the signal $V_{AN}$.

The phase signal supplied on lead 96 is coupled to the summing circuit 88 through a lag filter circuit 98 and a resistor 99 for supplying a reference control signal to the summing circuit 88 while the reference signals on leads 96 and 97 are combined to supply a disable control signal to the summing circuit 88 through a diode 100, a lag filter circuit 101 and a lead filter circuit 102.

Specifically, the lag filter circuit 98 includes a resistor 103 connected between the input lead 96 and the resistor 99 while a juncture circuit 104 is coupled to the system ground lead 80 through a capacitor 105. The lead filter circuit 102 provides an output at 106 which is coupled to the lead 96 through a capacitor 107 and to the lead 97 through a resistor 108. The lag filter circuit 101 includes a resistor 109 connected to the output circuit 106 and serially connected to the diode 100 through a resistor 110. A junction circuit 111 between resistors 109 and 110 is coupled to the system ground lead 80 through a capacitor 111a. The junction circuit between the resistor 110 and diode 100 is coupled to the system ground lead 80 through a diode 112.

An emitter circuit 113 of the transistor 90 is coupled to the system ground lead 80 while a collector circuit 114 is connected to the constant positive voltage lead 83 through a resistor 115 and to the ground lead 80 through a resistor 116. The collector circuit 114 is also connected to a base circuit 117 of a Darlington pair type transistor circuit 118 through a serially connected capacitor 119 and a resistor 120. The base circuit 117 is connected to the system ground lead 80 through a diode 121 and to the negative regulated voltage lead 84 through a resistor 122. An emitter circuit 123 is connected to the system ground lead 80 while a collector circuit 124 is coupled to the constant positive voltage lead 83 through an output circuit 125.

The output circuit 125 includes a resistor 126 connected to the lead 83 and coupled to the ground lead 80 through a serially connected capacitor 127. A junction circuit 128 between the resistor 126 and the capacitor 127 is coupled to the collector circuit 124 through a resistor 129 and a primary winding 130 of a transformer 131. A diode 132 is parallel connected to the primary winding 130 of the transformer 131. The transformer 131 further provides an output winding 133 which is directly connected to the output leads 78 for supplying firing control pulses to the static converter 23. A capacitor 134 is coupled between the constant positive voltage lead 83 and the system ground lead 80.

Figure 4:
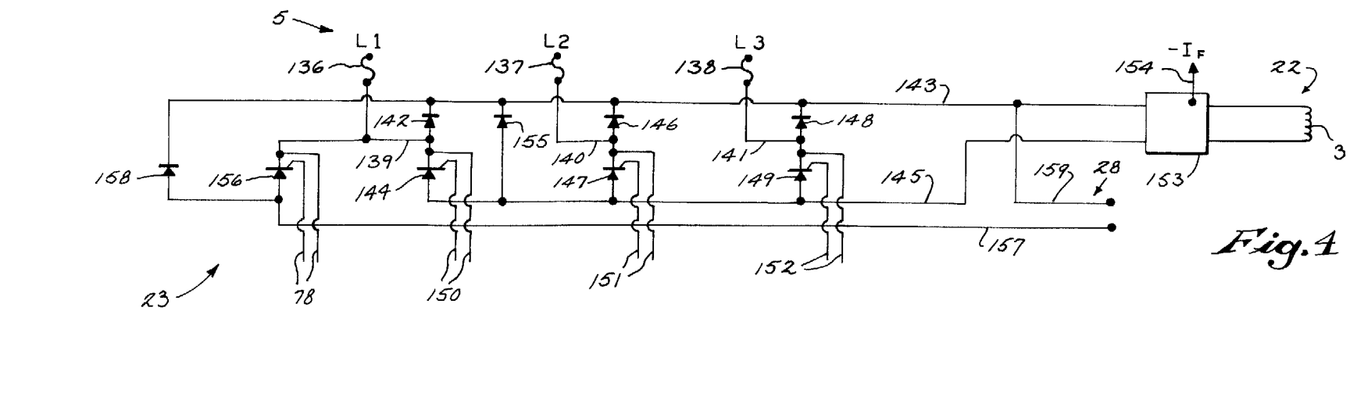
FIG. 4 is a circuit schematic showing the brake and field static power converter in FIG. 1.

The brake and field static power converter 23 is shown in FIG. 4 and receives the three-phase A.C. input 5 at the leads designated as L1, L2, and L3 to supply controlled amounts of direct current to the motor field circuit 3 through the output circuit 22 and further selectively supplies direct current to the brake 27 through the output circuit 28.

The three power leads L1, L2 and L3 are connected to the fuses 136, 137 and 138, respectively, to supply a phase A input at a lead 139, a phase B input at a lead 140, and a phase C input at a lead 141.

The phase A lead 139 is connected to the anode circuit of a diode 142 which, in turn, is connected to a direct current output lead 143. The lead 139 is also connected to a cathode circuit of a controlled rectifier 144 which, in turn, is connected to a direct current output lead 145. The phase B lead 140 is similarly connected to the output lead 143 through a diode 146 and to the output lead 145 through a controlled rectifier 147 while the phase C lead 141 is connected to the output lead 143 through a diode 148 and to the lead 145 through a controlled rectifier 149.

The controlled rectifiers 144, 147 and 149 each contain a pair of gating inputs 150, 151 and 152, respectively, with one lead connected to the controlled rectifier gating circuit and the other connected to the cathode circuit for providing a control to selectively render the controlled rectifiers conductive in response to gating pulses provided by the field gating circuit 24. The output leads 143 and 145 are connected to supply a direct energizing current to the field circuit 3 while a transformer circuit 153 is coupled to the leads 143 and 145 and provides an output circuit 154 supplying a field current indicative signal $-I_F$ for possible use in the field control circuit 26. A flyback diode 155 provides a cathode circuit connected to the lead 143 and control of the controlled rectifiers 144, 147 and 149 in response to the operation of the field gating circuit 24 and the field control 26 is more fully described in the above mentioned application entitled "TRANSPORTATION SYSTEM WITH MOTOR FIELD CONTROL."

The phase A lead 139 is also connected to a cathode circuit of a controlled rectifier 156 which, in turn, provides an anode circuit connected to an output lead 157. A diode 158 provides a cathode circuit connected to the lead 143 and an anode circuit connected to the lead 157. An output lead 159 is connected to the lead 143 so that the leads 157 and 159 are coupled to supply direct current energizing power to the brake 27.

FIG. 5 illustrates in diagrammatic form the interconnection of the D.C. motor 1 and the brake 27 for controlling the movement of an elevator car 160. Specifically, the armature circuit 2 of the D.C. motor 1 is coupled to selectively rotate a drive shaft 161 coupled either directly or through appropriate gearing (not shown) to a traction sheave 162. The car 160 is supported by a cable 163 which is reeved over the traction sheave 162 and provides an opposite end which is connected to a counterweight 164. The selective rotation of sheave 162 enables the car 160 to travel in the up or down direction through an elevator shaft which may include one or more guide rails 165 for providing service to any one of a plurality of floors, such as landing 166. A car door 167 generally cooperates with a hoist way door (not shown) when the car 160 is adjacent to a landing 166 to permit passenger transfer to and from the car.

The brake 27 is operatively coupled to the drive shaft 161 through brake shoes 168. Specifically, the brake shoes 168 are selectively operated to lift from the drive shaft 161 in accordance with the selective energization of a solenoid 169. A core element 170 of the solenoid 169 is coupled to an energizing coil 171 and is connected to the brake shoes 168 through an operating rod 172. The brake shoes 168 are biased into a first condition for fully engaging the drive shaft 161 by a biasing element illustrated as a spring 173 which is interconnected between a fixed reference support 174 and the movable core element 170. The coil 171 is connected in circuit to the brake and field static power converter 23 through the output circuit 28 including the leads 157 and 159 through the normally open contacts BK-4 and BK-5 of the brake relay. The energization of a coil 171 permits the brake shoes 168 to lift or move to a second position for disengagement from the drive shaft 161 for permitting rotatable operation of the sheave 162. A series resistance type circuit is parallel connected to the solenoid coil 171 and includes the resistors 175, 176 and 177. The lead 57 is connected to the junction between the resistors 175 and 176 while the lead 58 is connected to the junction circuit resistors the resistor 176 and 177 for supplying an output signal proportional to the voltage drop across the solenoid coil 171 to the feedback circuit 75 in the brake control 32.

The armature circuit 2 includes a pair of leads 178 which are connected in circuit to the output circuit 6 from the static power converter 4 through the normally open contacts M-3 and M-4 of the motor armature contactor relay. An impedance element shown as a resistor 179 is connected in circuit between the leads 178 through the normally open contacts DB-1 of the dynamic braking relay. The contacts DB-1 are generally maintained in an open position but may be selectively closed to dissipate energy from the armature circuit 2 through the resistor 179 under certain conditions should the static power converter 4 be disconnected from circuit by the opening of the contacts M-3 and M-4. An armature voltage sensing circuit is also connected across the leads 178 and includes the series connected resistors 180 and 181 which provide an output junction circuit 182 for supplying an armature voltage signal at the output lead 19. A portion of the supervisory control 13 is shown in FIG. 5 and includes a plurality of relays interconnected between a positive voltage source +VDC and a negative voltage source —VDC for selective energization. Specifically, a brake relay BK is connected in circuit through an open switch 183, a dynamic braking relay DB is connected in circuit through the open switch 184, and a motor armature contactor relay M is connected in circuit through an open switch 185. While the switches 183 through 185 are shown as manually operable, it is contemplated that such switching operation is preferably performed by automatically operated relay contacts or solid-state switching circuits and such operation is discussed in the previously referred to application entitled "TRANSPORTATION SYSTEM WITH MALFUNCTION MONITOR."

The combined brake and field static power converter 23 provides a highly novel construction in which certain circuit elements of the field static converter are shared for providing an A.C. to D.C. power conversion for the energization of the brake solenoid circuit 169. The controlled rectifiers 144, 147 and 149 function with the diodes 142, 146 and 148 to provide a varying direct output to the field circuit 3 in response to the operating control provided by the field gating circuit 24 by selectively gating pulses through the leads 150, 151 and 152. Such a circuit together with the fly-back diode 155 provides a highly desirable system for converting a three-phase alternating current input supplied from the source 5 to a varying controlled direct current output to the field circuit 3. Applicant has added the controlled rectifier 156 and the fly-back diode 158 to the field static power converter to additionally convert the three-phase alternating input supplied from the source 5 to a varying controlled direct current output at the leads 157 and 159 for selectively energizing the brake solenoid coil 169.

The controlled rectifier 156 is selectively rendered conductive in response to a gating pulse supplied from the brake gating circuit 30 through the leads 78 at an appropriate time during each alternating cycle of the phase A input. When the controlled rectifier 156 is rendered conductive, the phase B input at lead 140 conducts current through the diode 146 to the output leads 143 and 159 and the coil 171 with a current return path provided through the lead 157 and the controlled rectifier 156 to the phase A lead 139. In like manner, the phase C input at lead 141 conducts current through the diode 148 to the output leads 143 and 159 and the coil 169 and the return path including the lead 157 and the controlled rectifier 156 to the phase A lead 139. Current is this supplied from the phase B or phase C input or both during an appropriate time period of the alternating frequency for supplying uni-directional current to the brake solenoid 169 which is returned to the phase A input through the controlled rectifier 156. The fly-back diode 158 is placed across the brake solenoid coil 171 for circuit protection.

Figure 7:
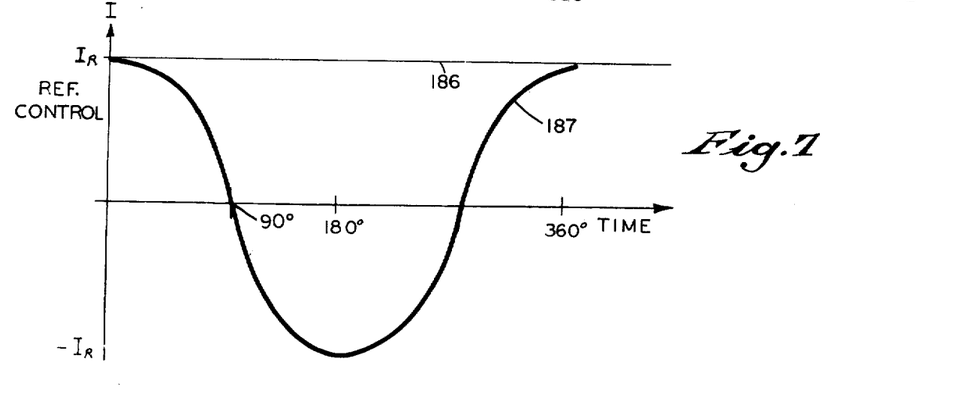
FIG. 7 is a diagrammatical graphical illustration showing a reference control waveform employed in the brake gating circuit of FIG. 3.
Figure 8:
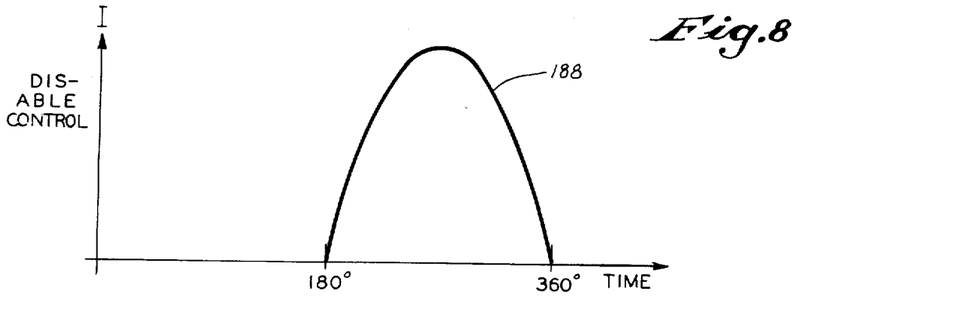
FIG. 8 is a diagrammatical illustration showing a disable control waveform utilized in the brake gating circuit in FIG. 3.

The brake gating circuit 30 shown in FIG. 3 is designed so that a positive current signal illustrated at 186 in FIG. 7 is supplied to the summing circuit 88 through the resistor 92 which tends to render the transistor 90 continually conductive irrespective of the alternating reference phase current signal 187 illustrated in FIG. 7 and supplied through the resistor 99 and the half-wave rectified disable current signal illustrated at 188 in FIG. 8 supplied through the diode 100, assuming that a brake lifting command signal has not been supplied at the input lead 33. The conduction or turning "on" of the transistor 90 operatively connects the resistor 115 to ground and renders the Darlington circuit 118 non-conductive or turned "off" to open circuit the primary winding 130 and prevent an output pulse from issuing on the leads 78 which results in the brake solenoid 169 being de-energized and the brake shoes 168 placed in a set condition.

Figure 6:
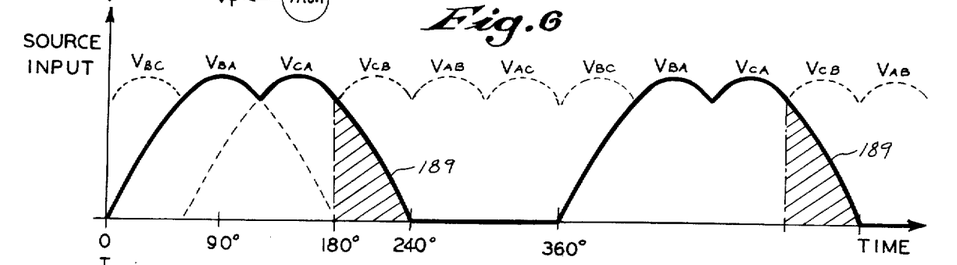
FIG. 6 is a diagrammatical graphical illustration showing voltage waveforms of the three-phase A.C. source in FIG. 1.

A brake lifting command signal provided by the brake control 32 and appearing at the input circuit 33 is supplied to the summing circuit 88 through the resistor 91 and designed to have a sufficient negative magnitude to render the transistor 90 non-conductive or turned "off" during an appropriate time portion of each alternating input power cycle. Irrespective of the magnitude of the brake lifting command signal supplied at input 33, the disable signal 188 supplied to the summing circuit 88 through the diode 100 operatively disables the brake gating circuit 30 during a one hundred eighty electrical degree portion of each alternating cycle by continually rendering the transistor 90 conductive during such time portion. Thus as illustrated by the brake voltage waveform 189 in FIG. 6, the gating circuit 30 is inoperative for supplying gating pulses from the 180° to the 360° time period. The transistor 90 is thus capable of being rendered non-conductive only during a 180 electrical degree time portion of each alternating input cycle as illustrated between 0 and 180 electrical degrees in FIG. 6. The firing of the controlled rectifier 156 prior to the one hundred eighty electrical degree time period will permit the rectifier 156 to pass brake energizing current until it is commutated off by the phase A polarity reversal generally at the 240 electrical degree time period. The waveform 189 represents the maximum permissible conduction for the controlled rectifier 156 and lesser time periods can be provided upon the summation of the reference control signal 187, the positive bias signal 186 and the negative polarity command signal supplied through the resistor 91 from the brake control circuit 32.

The controlled rectifier 156 is thus capable of being rendered conductive only during a maximum time period of two hundred forty electrical degrees of the source frequency which has been found to provide more than sufficient energizing power to maintain the brake shoes 168 lifted without chattering due to the residual flux maintained by the solenoid coil 171 between alternate half cycles. As a practical matter, the firing of the controlled rectifier 156 may be phased back to a considerable extend to permit conduction of the controlled rectifier 156 only during a portion of the 240 electrical degree maximum control range of each cycle to maintain the brake shoes 168 in a lifted condition.

The brake control 32 shown in FIG. 2 is rendered operational during each running sequence of the switches 37, 38 and 39 thereby energizing the relays L, ELAX and KIX, respectively. The contacts KIX-1 thus open and remain open during a normal satisfactory running sequence to condition the switching amplifier 48 for effective operation. In similar manner, the contacts ELAX-1 open and remain open during an entire running sequence in a normal and satisfactory running operation wherein the elevator system does not malfunction thus completely disconnecting the monitoring circuit 76 from the summing circuit 45. The closing of the switches 183 and 185 at the start of each running sequence energizes the relays BK and M, respectively, and the contacts BK-4, BK-5, M-3 and M-4 close to condition the system for operation.

At the initiation of the starting sequence, the energization of the line contactor relay L closes the contacts L-2 to provide a predetermined command signal to the summing circuit 45 from the command circuit 40 which is effective for rendering the switching amplifier 48 saturated to provide a maximum output at the lead 33 for commanding brake lifting potential to the brake solenoid circuit 169. The maximum commanded brake lifting voltage renders the controlled rectifier 156 conductive over the maximum 180 electrical degree range of firing for each source cycle. Such maximum voltage output as shown by the waveform 189 in FIG. 6 at the start of each run is designed to quickly lift the brake shoes 168 but continued energization at the maximum level would tend to burn out the solenoid coil 171 if maintained for any length of time. The voltage across the coil 171 is sensed at 29 to supply a brake voltage proportional signal to the lead 57 and 58 and thus provide a brake voltage proportional input to the summing circuit 45 through the feedback circuit 75. The fedback signal is inverted in polarity by the inverting amplifier 60 to supply a current input signal to the summing circuit 45 through the resistor 72 which opposes the command current signal supplied through the resistor 46. The output analog signal at input 47 of the switching amplifier 48 responds to the rapid increase of brake solenoid voltage and decreases to a magnitude to take the switching amplifier 48 out of saturation and decrease the negative command signal at the output lead 33 to a magnitude for maintaining the brake solenoid voltage at a stable and regulated magnitude to maintain the brake shoes 168 lifted. The brake lifting command signal supplied by the circuit 40 together with the fedback brake voltage signal through the feedback circuit 75 is effective for providing a brake lifting control signal at the lead 33 which initially requires a maximum magnitude brake solenoid voltage to quickly lift the brake 27 and thereafter maintain the brake voltage at a lesser predetermined magnitude to maintain the brake lifted so that the brake solenoid 169 will not be damaged by continued excessive high current for an excessive period of time. Applicant's preferred construction maintains the predetermined magnitude of brake lifting voltage during an entire normal operating run between landings to maintain the brake in a fully lifted condition.

When the car 167 has stopped at a landing 166, the switches 37, 38 and 39 open to de-energize the relays L, ELAX and KIX to open the contacts L-2, ELAX-1 and KIX-1 to provide a zero output signal at the lead 33 which commands the brake shoes 168 to be transferred to a set condition. The contacts L-2, L-3 and L-4 in FIG. 3 also open to render the brake gating circuit 30 inoperative for supplying gating pulses to the output leads 78. The switches 183 and 185 in FIG. 5 also open to de-energize the relays BK and M thus opening the contacts BK-4 and BK-5 to redundantly de-energize the brake solenoid 171 to ensure the transfer of the brake shoes 168 to the set condition while the contacts M-3 and M-4 open to de-energize the armature circuit and the contacts DB-1 close in response to the closing of the switch 184 to dissipate any stored energy in the armature circuit to condition the system for operation in the next operating sequence.

A highly desirable brake control is thus provided for operating an elevator system in a highly desirable manner which provides variable control by variably controlling a brake static power converter in a highly desirable manner. The brake static power converter supplies controlled varying amounts of direct current to the brake solenoid 169 using only a minimal amount of components by actively sharing some of the circuit components utilized in the field static power converting sequence.

Various modes of carrying out the invention are contemplated as being within the scope of the following claims particularly pointing out and distinctly claiming the subject matter which is regarded as the invention.

I claim:

1. A transportation system having a guide path structure and a plurality of spaced landings and transportation means comprising a transport vehicle, means mounting said vehicle for movement relative to said structure in a path extending adjacent each of said landings, motive means providing an output and moving said vehicle relative to said structure, braking means including a friction braking element coupled to said output and operable between lifted and set conditions to selectively permit vehicle movement, and control means cooperating with said motive means and said braking means and controlling movement of said vehicle relative to the structure and stopping said vehicle at a selecting landing, said control means including brake control means connected to a source of energy and selectively supplying controlled amount of energy to said braking means, said brake control means including sensing means coupled to said braking means and providing a brake energy signal relating to the energy supplied to said braking means and command means providing a brake command signal commanding said braking element to operate to said lifted condition and output means controlling the amount of energy supplied from said source to said braking means in response to said command signal and said brake energy signal.

2. The system of claim 1, wherein said braking means includes a solenoid circuit connected to control the operation of said friction braking element, and said sensing means sensing the voltage across said solenoid circuit provide to provide said brake energy signal.

3. The system of claim 1, wherein said output means includes selectively controllable gated rectifying means connected to said source and to said braking means.

4. The system of claim 1, wherein said brake control means includes summing means providing an analog output to said output means in response to the direct summation of said command signal and said brake energy signal.

5. The system of claim 4, wherein said output means includes gated rectifying means connected to said source and to said braking means and a switching circuit selectively operable from a first condition to a second condition to selectively render said gated rectifying means conductive in response to said analog output.

6. A transportation system having a guide path structure and a plurality of spaced landings and transportation means comprising a transport vehicle, means mounting said vehicle for movement relative to said structure in a path extending adjacent each of said landings, motive means provided an output and moving said vehicle relative to said structure, braking means coupled to said output and selectively permitting vehicle movement, and control means cooperating with said motive means and said braking means and controlling movement of said vehicle relative to the structure and stopping said vehicle at a selected landing, said control means including brake control means connected to a source of alternating energy and selectively supplying controlled amounts of energy to said braking means, said brake control means includng including means coupled to said source and providing an alternating source indicative signal relating to the alternating source energy and command means providing a brake command signal and output means controlling the amount of energy supplied from said source to said braking means in response to said command signal and said source indicative signal.

7. The system of claim 6, wherein said braking means includes a friction braking element selectively coupled to said motive means output and operable between lifted and set conditions to selectively permit vehicle movement.

8. The system of claim 6, wherein said brake control means includes summing means receiving said source indicative signal and said brake command signal, said sensing means including a lag filter network connecting said summing means and said source.

9. The system of claim 6, wherein said output means includes gated rectifying means connected to said source and said braking means, said brake control means includes disable means connected to said source and providing a disable signal, said output means responding to said disable signal and preventing the conduction of energy to said braking means by said gated rectifying means during a predetermined portion of each cycle of source energy.

10. The system of claim 9, wherein said brake control means includes summing means receiving said source indicative signal and said brake command signal and said disable signal, said disable means including a lag filter network connected to said summing means and a lead filter network connecting said lag filter network to said source.

11. The system of claim 6, wherein said brake control means includes summing means receiving said source indicative signal and said brake command signal and a constant reference signal provided by reference means.

12. The system of claim 6, wherein said brake control means includes summing means receiving said source indicative signal and said brake command signal and also receiving a constant reference signal provided by reference means and a disable signal provided by disable means and providing an output operatively permitting the supply of energy from said source to said braking means during a predetermined portion of each cycle of source energy.

13. The system of claim 6, wherein said brake control means includes summing means receiving said source indicative signal and said brake command signal and providing an output operatively controlling switching means providing an output selectively operable from a first condition to a second condition and selectively rendering gated rectifying means conductive to conduct energy from said source to said braking means.

14. The system of claim 13, wherein said second condition of said switching means output operatively connects energy storage means to said gated rectifying means.

15. The system of claim 14, wherein said switching means includes a first switching circuit having a first input circuit connected to said summing means and a first output circuit connected second input a second circuit of a second switching circuit having a second output connected to said storage means through a primary winding of an output transformer, said transformer having an output winding connected to said gated rectifying means.

16. The system of claim 6, wherein said brake control means includes sensing means coupled to said braking means and providing a brake energy signal relating to the energy supplied to said braking means, said output means responding to said command signal and said source indicative signal and said brake energy and controlling the amount of energy supplied from said source to said braking means.

17. The system of claim 6, wherein said output means includes gated rectifying means.

18. A transportation system having a guide path structure and a plurality of spaced landings and transportation means comprising a transport vehicle, means mounting said vehicle for movement relative to said structure in a path extending adjacent each of said landings, motive means providing an output and moving said vehicle relative to said structure, braking means including a solenoid circuit connected to control the operation of a friction braking element coupled to said output and selectively permitting vehicle movement, and control means including brake control means having a selectively controllable gated rectifying means connected to a source of energy, said control means operable to simultaneously supply energy to said motive means and uni-directional energy to said solenoid circuit and operate said braking means and control the movement of said vehicle relative to the structure and stop said vehicle at a selected landing.

19. A transportation system having a guide path structure and a plurality of spaced landings and transportation means comprising a transport vehicle, means mounting said vehicle for movement relative to said structure in a path extending adjacent each of said landings, motive means providing an output and moving said vehicle relative to said structure, braking means coupled to said output and selectively permitting vehicle movement, and control means cooperating with said motive means and said braking means and controlling movement of said vehicle relative to the structure and stopping said vehicle at a selected landing, said control means including brake control means connected to a source of alternating energy annd selectively supplying controlled amounts of energy to said braking means, said brake control means including first summing means receiving a first brake command signal from command means and a brake energy signal relating to the energy supplied to said braking means provided by first sensing means coupled to said braking means and providing a first summing means output to second summing means receiving an alternating source indicative signal relating to the alternating source energy provided by second sensing means coupled to said source and providing a second summing means output operatively controlling the magnitude of uni-directional energy supplied to said braking means.

20. A transportation system having a guide path structure and a plurality of spaced landings and transportation means comprising a transport vehicle, means mounting said vehicle for movement relative to said structure in a path extending adjacent each of said landings, motive means having an output and a field circuit operatively coupled to a polyphase energy source and moving said vehicle relative to said structure, braking means coupled to said output and selectively permitting vehicle movement, and control means cooperating with said motive means and said braking means and controlling movement of said vehicle relative to the structure and stopping said vehicle at a selected landing, said control means including a pair of rectifying devices connected to each source phase and connected across first and second output leads connected to said field circuit and a gated rectifying device connected to one of said source phases and to a third output lead, said first and third output leads connected to said braking means, said control means including brake control means connected to operatively control the operations of said gated rectifying device and the flow of energy from said source to said braking means.

21. The system of claim 20, wherein said control means further includes a fly-back diode connected between said first and third output leads.

22. The system of claim 20, wherein one of each of said pairs of rectifying devices includes a gated rectifying device selectively controlled by field gating control means.

23. A transportation system having a guide path structure and a plurality of space landings and transportation means comprising a transport vehicle, means mounting said vehicle for movement relative to said structure in a path extending adjacent each of said landings, motive means having an output and a field circuit operatively coupled to energy source means and moving said vehicle relative to said structure, braking means coupled to said output and selectively permitting vehicle movement, and control means cooperating with said motive means and said braking means and controlling movement of said vehicle relative to the structure and stopping said vehicle at a selected landing, said control means including means connected to said source means and including a uni-directional energy conducting element directly connected to supply energy to said brraking means and said field circuit.

24. The system of claim 23, wherein said field circuit includes field windings and said braking means includes solenoid windings, said uni-directional element directly electrically connected to said field and solenoid windings.

* * * * *

UNITED STATES PATENT AND TRADEMARK OFFICE
CERTIFICATE OF CORRECTION

PATENT NO. : 3,917,029
DATED : November 4, 1975
INVENTOR(S) : John T. Maynard

It is certified that error appears in the above-identified patent and that said Letters Patent are hereby corrected as shown below:

| | | |
|---|---|---|
| Column 1, Line 48, | Cancel "show" and substitute therefor ---shown---; |
| Column 2, Line 16, | Cancel "lifting" and substitute therefor ---lifted---; |
| Column 2, Line 56, | Cancel "grated" and substitute therefor ---gated---; |
| Column 3, Line 24, | After "summing" insert ---circuit---; |
| Column 3, Line 57, | Cancel "the"; |
| Column 4, Line 10, | Cancel "of" and substitute therefor ---at---; |
| Column 5, Line 20, | After "diagrammatical" insert ---graphical---; |
| Column 5, Line 27, | Cancel "and" and substitute therefor ---an---; |
| Column 5, Line 42, | Cancel "to the reverse" and substitute therefor ---to reverse the---; |
| Column 5, Line 60, | After "signal" second occurrence, insert ---at---; |
| Column 8, Line 53, | Cancel "A phase sensing circuit 95"; |
| Column 8, Line 54, | Start a new paragraph beginning with ---A phase sensing circuit 95---; |

UNITED STATES PATENT AND TRADEMARK OFFICE
CERTIFICATE OF CORRECTION

PATENT NO. : 3,917,029
DATED : November 4, 1975
INVENTOR(S) : John T. Maynard

It is certified that error appears in the above-identified patent and that said Letters Patent are hereby corrected as shown below:

Column 8, Line 59, Cancel "neutrak" and substitute therefor ---neutral---;

Column 8, Line 59, Cancel "neutral" and substitute therefor ---while---;

Column 10, Line 10, After "and" insert ---an anode circuit connected to the lead 145. The operation and---;

Column 10, Line 66, Cancel "resistors" and substitute therefor ---between---;

Column 10, Line 67, Cancel "resistor" and substitute therefor ---resistors---;

Column 11, Line 44, After "selectively" insert ---supplying---;

Column 12, Line 2, Cancel "this" and substitute therefor ---thus---;

Column 12, Line 68, Cancel "extend" and substitute therefor ---extent---;

Column 13, Line 5, After "sequence" insert ---by the closing---;

Column 13, Line 26, After "commanding" insert ---maximum---;

Column 14, Line 16, After "control" insert ---system---;

UNITED STATES PATENT AND TRADEMARK OFFICE
CERTIFICATE OF CORRECTION

PATENT NO. : 3,917,029
DATED : November 4, 1975
INVENTOR(S) : John T. Maynard

It is certified that error appears in the above-identified patent and that said Letters Patent are hereby corrected as shown below:

| | |
|---|---|
| Column 14, Line 44, CLAIM 1 | Cancel "selecting" and substitute therefor ---selected---; |
| Column 14, Line 46, CLAIM 1 | Cancel "amount" and substitute therefor ---amounts---; |
| Column 14, Line 61, CLAIM 2 | Cancel "provide" first occurrence; |
| Column 15, Line 13, CLAIM 6 | Cancel "provided" and substitute therefor ---providing---; |
| Column 15, Line 23, CLAIM 6 | Cancel "includng including" and substitute therefor ---including sensing---; |
| Column 16, Line 18, CLAIM 15 | After "connected" insert ---to a---; |
| Column 16, Line 29, CLAIM 16 | After "energy" insert ---signal---; |
| Column 16, Line 65, CLAIM 19 | Cancel "annd" and substitute therefor ---and---; |
| Column 18, Line 26, CLAIM 23 | Cancel "brraking" and substitute therefor ---braking---. |

Signed and Sealed this twenty-third Day of March 1976

[SEAL]

Attest:

RUTH C. MASON
Attesting Officer

C. MARSHALL DANN
Commissioner of Patents and Trademarks